US012121150B2

(12) United States Patent
Koulopoulos et al.

(10) Patent No.: US 12,121,150 B2
(45) Date of Patent: Oct. 22, 2024

(54) METHOD AND APPARATUS FOR DYNAMICALLY MOUNTING A CAMERA IN FRONT OF A DISPLAY SCREEN

(71) Applicant: PlexiCam, Inc, North Andover, MA (US)

(72) Inventors: Anastasios Michael Koulopoulos, North Andover, MA (US); Daniel Keldsen, Quincy, MA (US)

(73) Assignee: PlexiCam, Inc, North Andover, MA (US)

( * ) Notice: Subject to any disclaimer, the term of this patent is extended or adjusted under 35 U.S.C. 154(b) by 157 days.

(21) Appl. No.: 18/162,179

(22) Filed: Jan. 31, 2023

(65) Prior Publication Data
US 2023/0240445 A1    Aug. 3, 2023

Related U.S. Application Data

(60) Provisional application No. 63/308,587, filed on Feb. 10, 2022, provisional application No. 63/304,826, filed on Jan. 31, 2022.

(51) Int. Cl.
G03B 17/56     (2021.01)
A47B 97/00     (2006.01)
F16B 1/00      (2006.01)

(52) U.S. Cl.
CPC ............... *A47B 97/00* (2013.01); *F16B 1/00* (2013.01); *G03B 17/561* (2013.01); *A47B 2097/005* (2013.01); *F16B 2200/83* (2023.08)

(58) Field of Classification Search
CPC ................. A47B 2097/005; G03B 17/561
See application file for complete search history.

(56) References Cited

U.S. PATENT DOCUMENTS

| 2 A | 7/1836 | Goulding |
| 2,614,471 A | 10/1952 | Joseph |

(Continued)

FOREIGN PATENT DOCUMENTS

| CN | 209787247 U | 12/2019 |
| CN | 216619409 U | 5/2022 |

(Continued)

OTHER PUBLICATIONS

NPL_BUZZI_First Look: Dell's 'Concept Pari' Is a Webcam You Can Mount in the Middle of Your Screen_Dec. 15, 2021.

(Continued)

*Primary Examiner* — Leon W Rhodes, Jr.
(74) *Attorney, Agent, or Firm* — Rowan TELS LLC

(57) ABSTRACT

A magnetic webcam mounting assembly apparatus and method of use are disclosed herein for positioning a movable webcam connected to a computer relative to a screen display of the computer while imaging a user in select, reciprocal viewing alignment with the screen display. The magnetic webcam mounting assembly comprises a magnetic base and a connector assembly. The magnetic base includes a magnetic base coupling assembly. The connector assembly includes a connector assembly body having a first end of the connector assembly body and a second end of the connector assembly body. The connector assembly further includes a base connector assembly attached to the first end of the connector assembly body and configured to couple with the magnetic base coupling assembly. The connector assembly finally includes a webcam connector assembly attached to a second end of the connector assembly body and configured to mount the movable webcam.

20 Claims, 10 Drawing Sheets

(56) References Cited

U.S. PATENT DOCUMENTS

| | | | |
|---|---|---|---|
| 4,473,177 A | 9/1984 | Parandes | |
| 5,260,731 A | 11/1993 | Baker, Jr. | |
| 6,027,085 A | 2/2000 | Ruther | |
| 6,554,433 B1 | 4/2003 | Holler | |
| 6,848,842 B2 * | 2/2005 | Saruhashi | H04N 23/50 |
| | | | 348/E5.025 |
| 6,943,843 B2 * | 9/2005 | Boyden | H04N 7/144 |
| | | | 348/373 |
| 7,126,627 B1 | 10/2006 | Lewis et al. | |
| 8,075,318 B2 | 12/2011 | Zhao et al. | |
| 8,189,029 B2 | 5/2012 | Wijngaarden et al. | |
| 8,593,567 B2 | 11/2013 | Xiao | |
| 8,672,693 B2 | 3/2014 | Liu | |
| 8,754,923 B2 | 6/2014 | Chong et al. | |
| 8,941,715 B1 | 1/2015 | McNelley et al. | |
| 9,419,395 B1 | 8/2016 | Morvillo | |
| 9,894,259 B2 | 2/2018 | Kakou et al. | |
| 9,991,628 B2 | 6/2018 | Daoura | |
| 10,148,908 B2 | 12/2018 | Odamaki et al. | |
| 10,192,665 B2 | 1/2019 | Breiwa et al. | |
| 10,887,494 B2 | 1/2021 | Germe et al. | |
| 11,174,985 B1 * | 11/2021 | Koulopoulos | G06F 1/1607 |
| 11,381,776 B2 | 7/2022 | Nimmo | |
| 11,388,324 B2 * | 7/2022 | Okuley | H04N 7/144 |
| 2004/0215966 A1 | 10/2004 | Elteto | |
| 2005/0041966 A1 | 2/2005 | Johnson | |
| 2005/0196163 A1 | 9/2005 | Mootz et al. | |
| 2008/0087779 A1 | 4/2008 | Liow et al. | |
| 2008/0088696 A1 | 4/2008 | Giraldo | |
| 2012/0169838 A1 | 7/2012 | Sekine | |
| 2012/0257004 A1 | 10/2012 | Smith et al. | |
| 2016/0187763 A1 | 6/2016 | Fromm | |
| 2016/0191755 A1 | 6/2016 | Fromm | |
| 2017/0068149 A1 | 3/2017 | Fromm | |
| 2017/0152989 A1 | 6/2017 | Gulanes et al. | |
| 2019/0249402 A1 | 8/2019 | Whitfield et al. | |
| 2019/0277022 A1 | 9/2019 | Francis | |
| 2019/0309897 A1 | 10/2019 | Pirretas et al. | |
| 2019/0309898 A1 | 10/2019 | Krake et al. | |
| 2019/0376639 A1 | 12/2019 | Bowman et al. | |
| 2020/0124227 A1 | 4/2020 | Fine et al. | |
| 2020/0340618 A1 | 10/2020 | Hickey | |
| 2021/0006751 A1 | 1/2021 | Visosky | |
| 2022/0201244 A1 | 6/2022 | Baney et al. | |
| 2023/0185169 A1 * | 6/2023 | Files | H04N 7/142 |
| | | | 396/281 |

FOREIGN PATENT DOCUMENTS

| | | | |
|---|---|---|---|
| DE | 202011101226 U1 | | 8/2011 |
| JP | 2008289035 A | * | 11/2008 |
| KR | 20060073229 A | | 6/2006 |
| KR | 20210001648 U | | 7/2021 |
| WO | 2014002091 A2 | | 1/2014 |
| WO | 2022040986 A1 | | 3/2022 |

OTHER PUBLICATIONS

NPL_Scosche.com_MagicMount Elite Double Pivot Magnetic Mount_Part No. MEDPMSR.

* cited by examiner

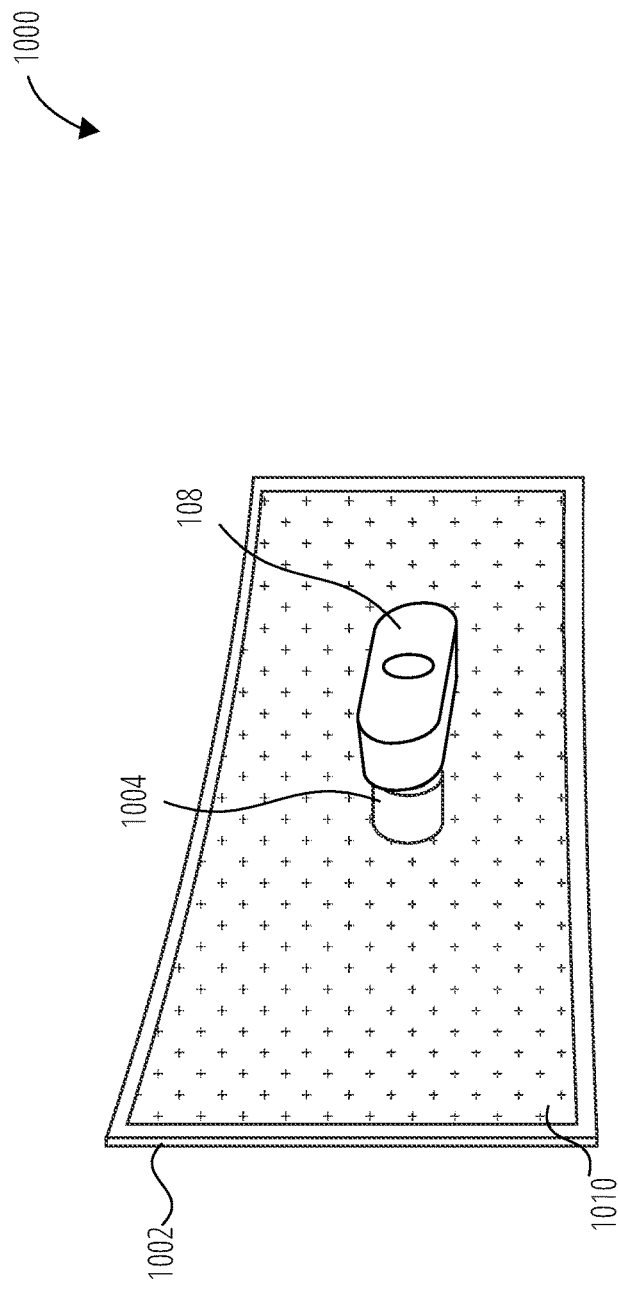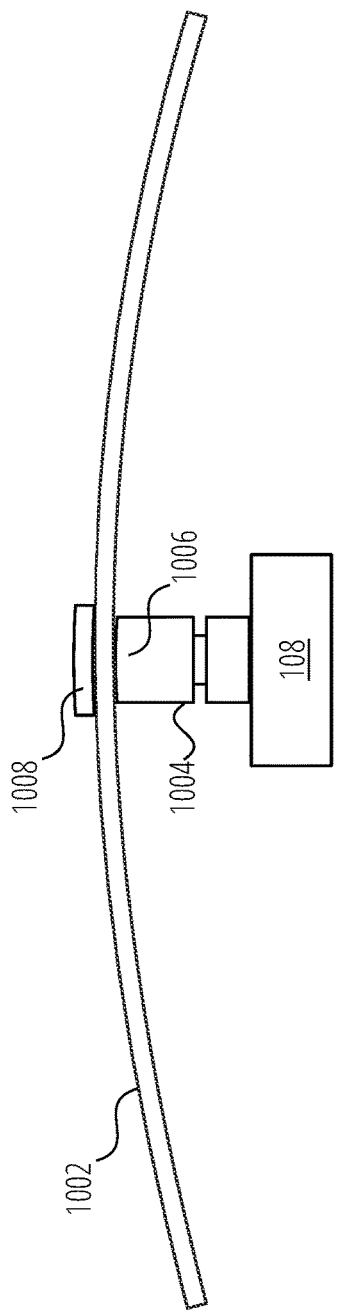
FIG. 10A
FIG. 10B

METHOD AND APPARATUS FOR DYNAMICALLY MOUNTING A CAMERA IN FRONT OF A DISPLAY SCREEN

CROSS-REFERENCE TO RELATED APPLICATIONS

This application claims the benefit of U.S. provisional patent application Ser. No. 63/304,826, filed on Jan. 31, 2022, and the benefit of U.S. provisional patent application Ser. No. 63/308,587, filed on Feb. 10, 2022, the contents each of which is incorporated herein by reference in its entirety.

BACKGROUND

Using web cameras or webcams has become commonplace due to the extensive use of web-based meeting and conferences (such as Skype®, Zoom®, GoToMeeting®, and Webex®). These meetings and conferences are meant to replace or supplant face to face meetings. It is critical in these experiences, as in their face-to-face physical equivalents, to maintain eye contact in order to make the connection between the users as meaningful as possible. Eye contact is a critical part of human communication. Without it conversations are awkward and far less effective.

Webcams currently incorporated into laptop or desktop computers, tablets, or mobile devices (such as smartphones) are positioned in a way that they are not directly in the line of sight of the screen. One of two situations usually occurs: the user looks at the person they are talking to on their screen, thereby not looking at the camera which is offset from the center of the screen and located on its perimeter, or the user looks at the camera and are prevented from seeing the person on the screen that they are talking to. In both cases the disconnected nature of the conversation undermines the objective of making a meaningful human connection through the web-based video, since neither party to the conversation is viewing the other party while looking at their cameras.

Webcams that are not part of a computer device and used as part of a video or web conferencing system are also not able to be positioned in front of the screen display so that the user is looking directly at the person(s) they are speaking with. This is due to there being no way to do that without significantly obscuring the user's view of the screen, either because; A) the mounting apparatus (a tripod, articulating arm, or other mount) obscures the view of the screen, B) the webcam is not positioned on the screen and the further from the screen and closer to the user that it is, the more of the screen it obscures, or C) in the case of a laptop, there is no way to position the web cam in front of the screen due to the position of the keyboard.

Webcams integrated into the center of computer displays, while not yet available, will require that users upgrade to displays with these capabilities and will therefore limit the computers/laptops/tablets, desktop screens on which users can maintain eye contact by requiring them to use only those devices. Any webcam integrated as part of the actual viewing area of the display will also be permanently positioned so that it cannot be repositioned as needed by the user.

For these reasons, there is a need for processes and components that support mounting a movable webcam before a screen display in a manner that allows a user to freely position the movable webcam within an area that naturally falls within the user's line of sight, thus providing a more natural and engaged eye-line for multiple users interacting via video conference, viewing each other's images as captured by their respective webcams.

BRIEF SUMMARY

Disclosed herein is a method of positioning a movable webcam connected to a computer relative to a screen display of the computer while imaging a user in select, reciprocal viewing alignment with the screen display. The method includes providing a magnetic webcam mounting assembly comprising a magnetic base, a magnetic base coupling assembly on the magnetic base, a connector assembly including a connector assembly body, a base connector assembly attached to a first end of the connector assembly body and configured to couple with the magnetic base coupling assembly, and a webcam connector assembly attached to a second end of the connector assembly body, the web cam connector assembly configured to mount the movable webcam. The method further includes securing the movable webcam to the webcam connector assembly. The method further includes positioning the magnetic webcam mounting assembly in relationship to the screen display to secure the movable webcam on a screen surface of a select screen display region generally coextensive with an image being observed by the user. On condition the screen display has a magnetic component behind the screen surface, the method includes securing the magnetic webcam mounting assembly to the surface of the screen display by magnetically coupling the magnetic base to the screen display. On condition the screen display does not have the magnetic component behind the screen surface, the method includes securing the magnetic webcam mounting assembly to the screen surface of the screen display by placing a metal backing plate behind the screen display such that the magnetic base is coupled to the screen display by magnetic attraction to the metal backing plate. In this manner, viewing of the image by the user facilitates the viewing of the user viewing the image in select, reciprocal viewing alignment therewith.

A magnetic webcam mounting assembly apparatus is also disclosed herein for positioning a movable webcam connected to a computer relative to a screen display of the computer while imaging a user in select, reciprocal viewing alignment with the screen display. The magnetic webcam mounting assembly comprises a magnetic base with a ball joint socket attached to the magnetic base. The magnetic webcam mounting assembly further comprises an articulating ball joint connector assembly including a connector assembly body, a ball joint attached to a first end of the connector assembly body, and a webcam connector assembly attached to a second end of the connector assembly body. The ball joint is configured to couple with the ball joint socket. The webcam connector assembly is configured to mount the movable webcam. On condition the screen display does not have a magnetic component behind a screen surface, the magnetic webcam mounting assembly includes a metal backing plate configured to secure the magnetic webcam mounting assembly to the screen surface of the screen display when the metal backing plate is positioned behind the screen display such that the magnetic base is coupled to the screen display by magnetic attraction to the metal backing plate. The magnetic webcam mounting assembly is configured to secure the movable webcam to the surface of the screen display in a select screen display region generally coextensive with an image being observed by the user, so that viewing of the image by the user facilitates the viewing of the user viewing the image in select, reciprocal viewing alignment therewith.

Also disclosed is a magnetic webcam mounting assembly apparatus for positioning a movable webcam connected to a computer relative to a screen display of the computer while imaging a user in select, reciprocal viewing alignment with the screen display. The magnetic webcam mounting assembly comprises a magnetic base with a ball joint socket attached to the magnetic base. The magnetic webcam mounting assembly further comprises an articulating ball joint connector assembly including a connector assembly body, a ball joint attached to a first end of the connector assembly body, and a webcam connector assembly attached to a second end of the connector assembly body. The ball joint is configured to couple with the ball joint socket. The webcam connector assembly is configured to mount the movable webcam. The magnetic webcam mounting assembly comprises a generally transparent screen display attachment for mounting to and horizontal movement across an upper region of the screen display while suspended downwardly thereacross. The magnetic webcam mounting assembly comprises a metal backing plate configured to secure the magnetic webcam mounting assembly to the surface of the generally transparent screen display attachment when the metal backing plate is positioned behind generally transparent screen display attachment such that the magnetic base is coupled to the generally transparent screen display attachment by magnetic attraction to the metal backing plate. The generally transparent screen display attachment, the magnetic webcam mounting assembly, and the metal backing plate are configured to be positioned in relationship to the screen display for supporting the movable webcam in a select screen display region generally coextensive with an image being observed by the user, so that viewing of the image by the user facilitates the viewing of the user viewing the image in select, reciprocal viewing alignment therewith.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A shows an assembled view and FIG. 1B an exploded view of the magnetic webcam mounting assembly 100.

FIG. 7A shows an elevation view and FIG. 7B a perspective view of user lines of sight 700.

FIG. 10A and FIG. 10B illustrate a curved screen display configuration 1000 in accordance with one embodiment. FIG. 10A shows a perspective view and FIG. 10B a plan view of the curved screen display configuration 1000.

DETAILED DESCRIPTION

A magnetic webcam mounting assembly and method of use of such is disclosed herein, for use with a movable webcam of the user's choice and connected to a computer or other video conferencing display. The disclosed solution allows a user to position their movable webcam relative to a screen display such that the webcam may image (i.e., capture video of) the user in select, reciprocal viewing alignment with the screen display. Reciprocal viewing alignment means that any two remote users in video communication with each other and using the disclosed solution may effectively look at each other directly in the eyes on their respective screen displays while also appearing to each other to be looking at each other directly in the eyes.

In lay terms, the disclosed solution allows a movable webcam to be positioned at a desired position in front of a screen display, held in place there through magnetic attraction. The magnetic webcam mounting assembly may be attached directly to a magnetically attracted monitor, or to a thin monitor or a generally transparent screen display attachment positioned in front of the monitor using a metal backing plate. In this manner, the movable webcam mounted to the magnetic webcam mounting assembly may be moved to any position on a screen display through horizontal and vertical motion across the screen display. In addition, the disclosed mounting assembly may allow the movable webcam to be tilted up and down and from side to side through articulation of a joint, such as a ball and socket joint, between the magnetic base and the connector assembly.

Use of the magnetic webcam mounting assembly in conjunction with the generally transparent screen display attachment allows the user to avoid attaching the apparatus directly to the surface of a delicate screen display. The transparent material of the attachment may allow the user to see almost all of their screen except for that portion obscured by the webcam and the mounting assembly. The movable webcam's vertical and horizontal position may then be adjusted so that it is directly in the user's line of sight and thereby allows the user to appear to others, with whom he or she is engaged in a video call, to be looking directly at them. The magnetic webcam mounting assembly may be repositioned across the generally transparent screen display attachment, and the generally transparent screen display attachment may be repositioned across the screen surface. Multiple shelves may be attached to the generally transparent screen display attachment to support positioning additional devices such as a ring light or light emitting diode (LED) light near the movable webcam.

Figure 3:
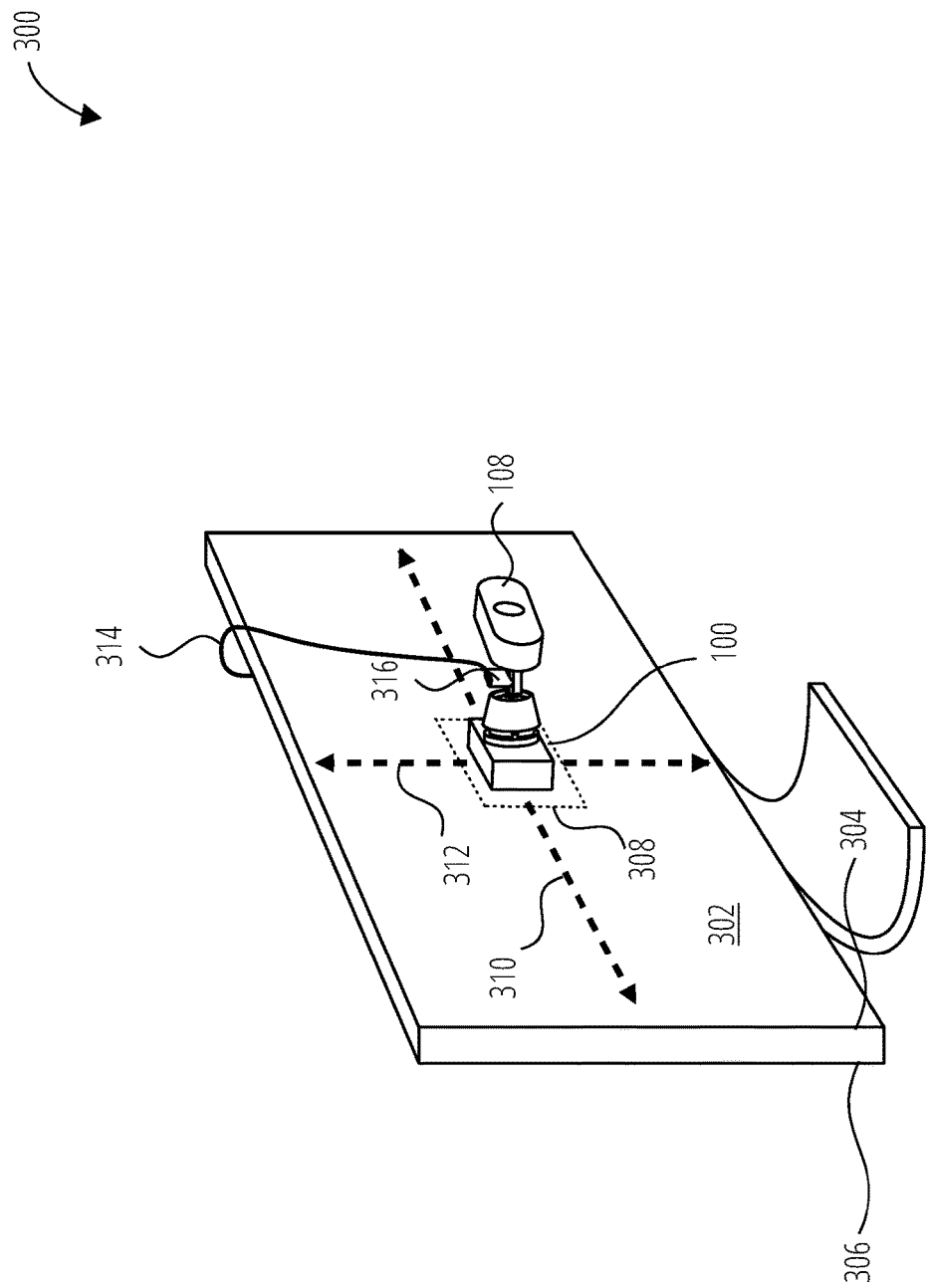
FIG. 3 illustrates a magnetic webcam mounting assembly used with magnetically attracted screen display 300 in accordance with one embodiment.
Figure 4:
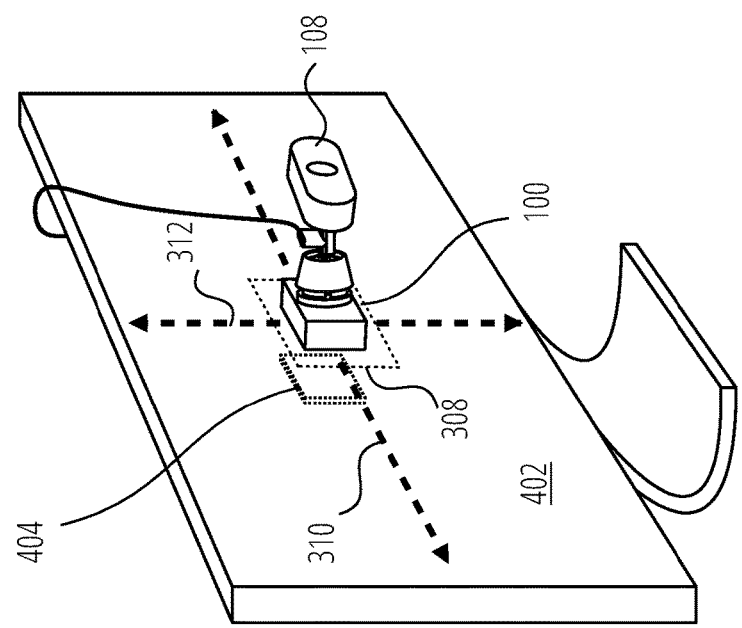
FIG. 4 illustrates a magnetic webcam mounting assembly used with metal backing plate 400 in accordance with one embodiment.
Figure 5:
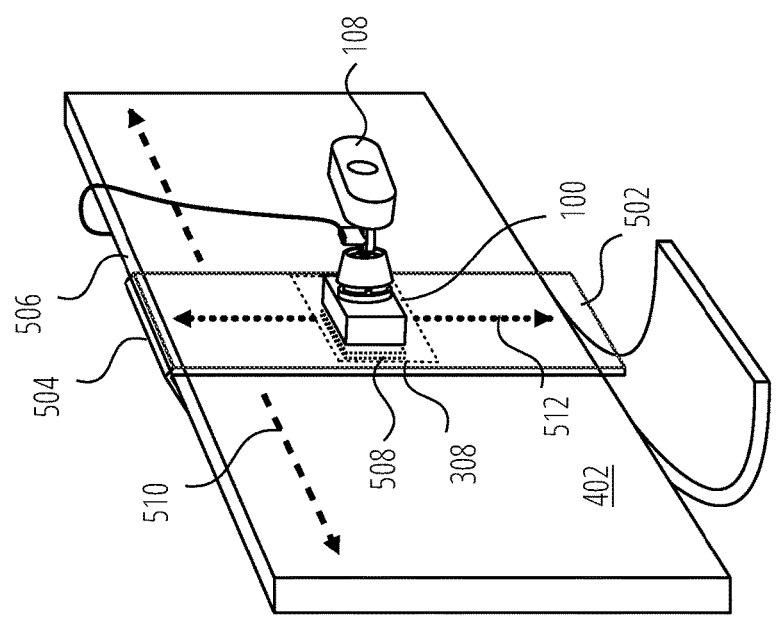
FIG. 5 illustrates a magnetic webcam mounting assembly with metal backing plate and generally transparent screen display attachment 500 in accordance with one embodiment.

Disclosed is a magnetic webcam mounting assembly and method of use for the same that may be used easily with any display or monitor to allow participants in a video conference to each look at the other person on screen while also looking at the camera, as illustrated in the figures below. The mounting assembly may attach to a screen display using either magnetic coupling to a metal backing plate which is positioned on the back of the display or behind a generally transparent screen display attachment or using direct magnetic coupling to a magnetically attracted screen display. The magnetic coupling forces may keep the mounting assembly in place with respect to the screen display while also allowing it to easily be repositioned as shown in FIG. 3, FIG. 4, and FIG. 5. This allows users to have a web video call and to look directly at the person they are talking to on their screen while maintaining apparent eye contact as seen on that person's video feed, creating a sense of sincerity, connection, and engagement.

The magnetic webcam mounting assembly may be portable and transferable to any screen display and may be used with any webcam or device which captures moving or still images, provided the device is compatible with the webcam connector assembly portion of the magnetic webcam mounting assembly. The mounting assembly may mount easily to the screen display with no additional hardware needed.

Advantages Over Existing Mounts

Existing webcams are large and bulky and cannot be mounted easily in front of or on a computer screen without obscuring the user's view of the screen. No mounting system exists that takes this into account. Tripods and other photographic mounting systems cannot be used since they would: act to obscure the user's view of the screen; rest on the keyboard if a laptop computer is being used; or be positioned too far away from the screen, causing the user's image on the receiving end of a video conversation to appear to be looking past the camera.

Webcams built into laptops, desktops, monitors, tablets, and mobile devices are all offset and integrated into the perimeter of the viewing surface, making it impossible to look at the camera and also at the person with whom the user is conducting the web video call. The disclosed solution overcomes these challenges by providing a universal mounting system that allows the movable webcam to be positioned anywhere on any display screen.

Other Uses or Applications

Because the device may be positioned at any point on a display screen or projected image, it may also be used to more precisely track the user's gaze to determine what they are looking at. This may assist people with disabilities, or be used to track eye movement for behavioral, marketing, or other cases where the point on the display at which the user is looking needs to be determined.

Figure 1:
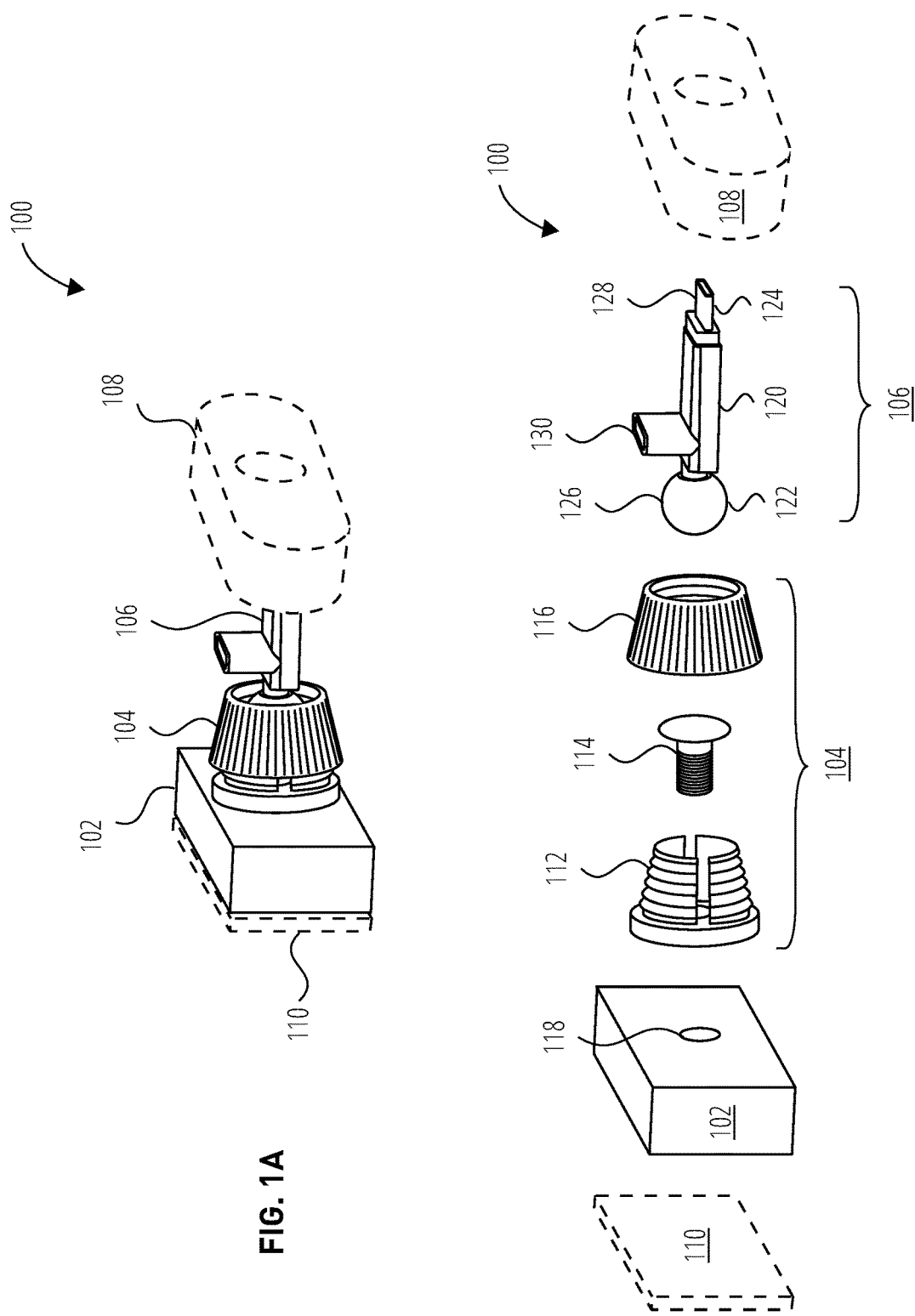
FIG. 1A and FIG. 1B illustrate a magnetic webcam mounting assembly 100 in accordance with one embodiment.

FIG. 1A and FIG. 1B illustrate a magnetic webcam mounting assembly 100 in accordance with one embodiment. FIG. 1A shows an assembled view and FIG. 1B an exploded view of the magnetic webcam mounting assembly 100. The magnetic webcam mounting assembly 100 comprises a magnetic base 102, a magnetic base coupling assembly 104, and a connector assembly 106. A movable webcam 108 and metal backing plate 110 are shown for illustrative purposes. The elements of this magnetic webcam mounting assembly 100, along with the movable webcam 108 and metal backing plate 110 may be used to carry out the steps of the routine for positioning a movable webcam relative to a screen display 200 described with respect to FIG. 2.

In one embodiment, the magnetic base coupling assembly 104 may comprise a threaded ball seat 112, screw 114, and ball tightening nut 116. The screw 114 may be used to attach the threaded ball seat 112 to the magnetic base 102 by screwing it into a threaded screw hole 118 in the magnetic base 102. The ball tightening nut 116 may be configured to then screw onto the threaded ball seat 112.

Figure 6A:
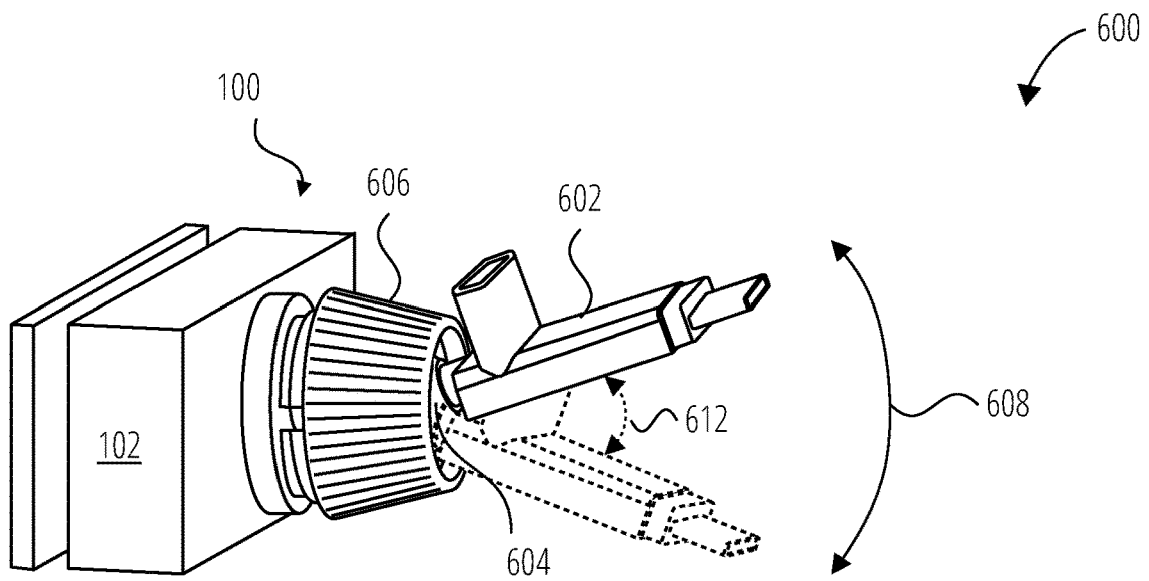
FIG. 6A and FIG. 6B illustrate webcam articulation 600 in accordance with one embodiment.
Figure 6B:
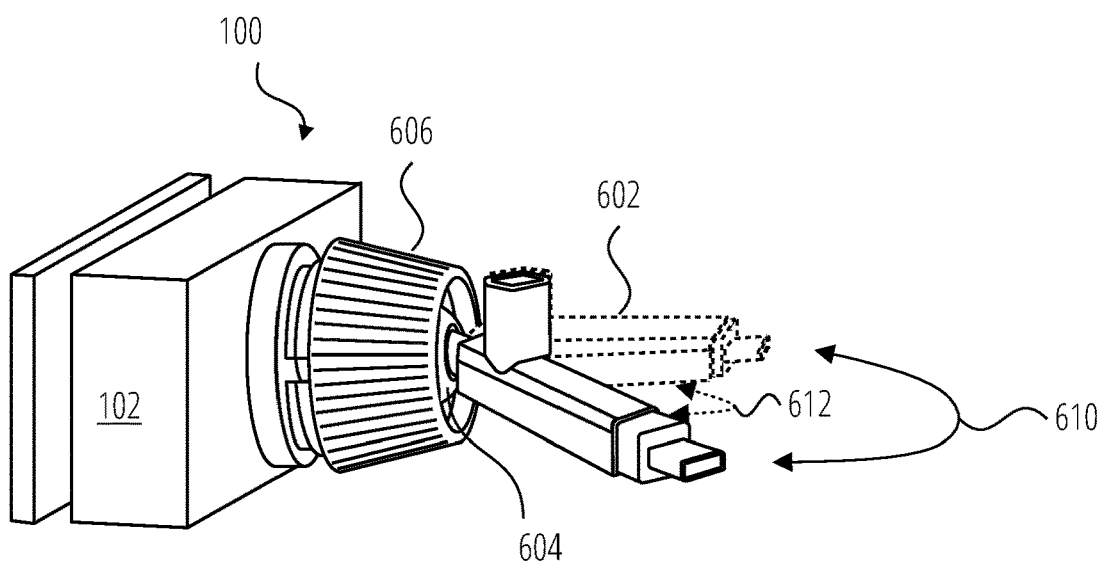

The connector assembly 106 may be configured with a connector assembly body 120 having a first end of the connector assembly body 122 and a second end of the connector assembly body 124. In one embodiment, the first end of the connector assembly body 122 may include a base connector assembly 126 to connect the connector assembly 106 to the magnetic base coupling assembly 104. In one embodiment, such as is shown, the base connector assembly 126 may include a ball joint capable of being captured by the threaded ball seat 112 and ball tightening nut 116, allowing articulated movement in two dimensions, as shown in FIG. 6A and FIG. 6B.

The second end of the connector assembly body 124 may be configured with a webcam connector assembly 128 in order to attach the movable webcam 108 to the magnetic webcam mounting assembly 100. In one embodiment, as shown, the webcam connector assembly 128 may comprise an electrical connector intended to carry video signals, such as a universal serial bus (USB) connector. In one embodiment, the connector assembly body 120 may further comprise a video signal connection 130, such as a USB connection, configured to accept the attachment of a signaling cable, such as a USB cable. In this manner, the connector assembly 106 may electrically couple a movable webcam 108 to a computer, such as that described with respect to the computing device 1100 of FIG. 11, in addition to mechanically coupling the movable webcam 108 to the magnetic webcam mounting assembly 100. Note that for illustration the connector assembly body is molded to a cable connector with the cable slot shown on top. However the connector may be used and molded as part of the connector assembly in any orientation, and the connected cable may be routed to the top, bottom, left, or right.

Figure 2:
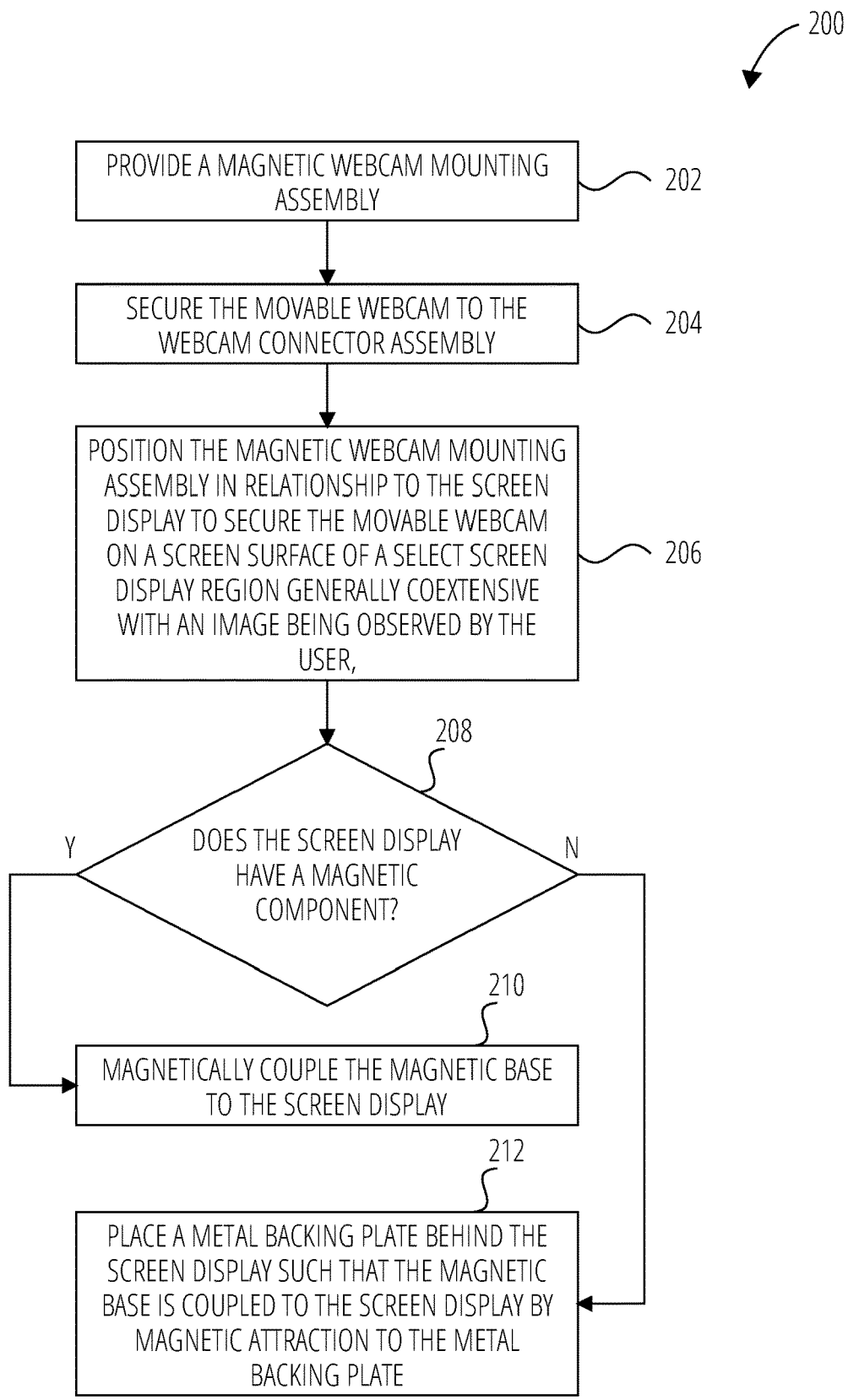
FIG. 2 illustrates a routine for positioning a movable webcam relative to a screen display 200 in accordance with one embodiment.

FIG. 2 illustrates a routine for positioning a movable webcam relative to a screen display 200 in accordance with one embodiment. The steps of the routine for positioning a movable webcam relative to a screen display 200 may be implemented using the magnetic webcam mounting assembly 100 introduced with respect to FIG. 1A and FIG. 1B. Although the example routine for positioning a movable webcam relative to a screen display 200 depicts a particular sequence of operations, the sequence may be altered without departing from the scope of the present disclosure. For example, some of the operations depicted may be performed in parallel or in a different sequence that does not materially affect the function of the routine for positioning a movable webcam relative to a screen display 200. In other examples, different components of an example device or system that implements the routine for positioning a movable webcam relative to a screen display 200 may perform functions at substantially the same time or in a specific sequence.

According to some examples, the method includes providing a magnetic webcam mounting assembly at block 202. In one embodiment, the routine for positioning a movable webcam relative to a screen display may include connecting a video signal to the webcam connector assembly where the webcam connector assembly further comprises a video signal connection on the connector assembly body. In one embodiment, the video signal connection may be a USB connection. In one embodiment, the video signal connection may be substantially perpendicular to the connector assembly body. In one embodiment, the magnetic base coupling assembly may be a ball joint socket and the connector assembly may be an articulating ball joint connector assembly including a ball joint attached to the first end of the connector assembly body. The ball joint may be configured to couple with the ball joint socket. In one embodiment, the routine for positioning a movable webcam relative to a screen display 200 may then include adjusting, relative to the user, an angle of the movable webcam by rotating the articulating ball joint connector assembly in the ball joint socket. In one embodiment, the magnetic base and connector assembly may interface via other components as are well understood by those skilled in the art, such as hinge joints, saddle joints, swivel joints, suction devices, magnetic coupling, or through permanent connection through a soldered joint or by being molded as part of the magnetic base.

According to some examples, the method includes securing the movable webcam to the webcam connector assembly at block 204. In one embodiment, the webcam connector assembly may comprise a clamp configured to secure the movable webcam by applying a compressive force against opposing sides of the movable webcam. In this manner, securing the movable webcam to the webcam connector assembly may include placing the movable webcam within the clamp. In one embodiment, the webcam connector assembly may comprise an adhesive component configured to adhere to the back of the movable webcam. In this manner, securing the movable webcam to the webcam connector assembly may include pressing the movable webcam against the adhesive component. In one embodiment, the webcam connector assembly may comprise an electrical connector for power and/or video signals. This electrical connector may be in direct or indirect connection with a video signal connection configured on the connector assembly. In this manner, securing the movable webcam to the webcam connector assembly may comprise engaging this electrical connector with a mating connector on the back of the movable webcam.

According to some examples, the method includes positioning the magnetic webcam mounting assembly in relationship to the screen display to secure the movable webcam on a screen surface of a select screen display region generally coextensive with an image being observed by the user, at block 206.

If the screen display has a magnetic component capable of coupling to the magnetic base, as determined at decision block 208, the routine for positioning a movable webcam relative to a screen display 200 may comprise magnetically coupling the magnetic base to the screen display at block 210. In one embodiment, the routine for positioning a movable webcam relative to a screen display 200 may also include placing a transparent plastic sheet between the surface of the screen display and the magnetic base. In this manner, the screen display may be protected from damage or residue from the magnetic webcam mounting assembly when in direct contact with it.

According to some examples, the method includes doing the screen display have a magnetic component at decision block 208.

If the screen display does not include a magnetic component, as determined at decision block 208, the routine for positioning a movable webcam relative to a screen display 200 may continue to block 212. According to some examples, the method includes placing a metal backing plate behind the screen display such that the magnetic base is coupled to the screen display by magnetic attraction to the metal backing plate at block 212.

Through the implementation of routine for positioning a movable webcam relative to a screen display 200, the viewing of the image by the user may in this manner facilitate imaging the user in select, reciprocal viewing alignment.

FIG. 3 illustrates a magnetic webcam mounting assembly used with magnetically attracted screen display 300 in accordance with one embodiment. A magnetically attracted screen display 302 may include a screen surface 304 and a magnetic component 306 residing behind the screen surface 304. For example, the rear of the magnetically attracted screen display 302 may be configured as a panel made from a ferrous metal or other material able to couple magnetically to the magnetic webcam mounting assembly 100. Alternately, a layer of such material may reside between the magnetically attracted screen display 302 and the rear panel of the screen display. A clear material having magnetic properties may be developed, and may act as the screen surface 304, able to couple to the magnetic webcam mounting assembly 100 directly.

In this manner, the magnetic webcam mounting assembly 100 may be used without the metal backing plate to couple directly to the magnetically attracted screen display 302, at a location within a select screen display region 308, where a user may wish to maintain a direct eye-line or gaze into the camera capturing video of that user. This select screen display region 308 may not be in the center of the screen as shown at all times. The magnetic webcam mounting assembly 100 allows both horizontal motion 310 and vertical motion 312 of the movable webcam 108 across the magnetically attracted screen display 302, such that the movable webcam 108 may be configured within a select screen display region 308 anywhere on the screen surface 304 of the magnetically attracted screen display 302.

FIG. 3 further illustrates a configuration where the connector assembly body of the magnetic webcam mounting assembly 100 is configured with a USB connection 316 substantially parallel with the connector assembly body. The movable webcam 108 may be coupled to the magnetic webcam mounting assembly 100 through mating of an electrical connector at the second end of the connector assembly body with a USB connection on the rear of the movable webcam 108. A USB video signal cable 314 may be coupled with the USB connection 316 to connect the movable webcam 108 to a computer, such as the computing device 1100 shown in FIG. 11 or other video conference hardware. In one embodiment, a different connection protocol may be incorporated into the connector assembly, such as High-Definition Multimedia Interface (HDMI). Alternately, a fully wireless movable webcam may engage with a connector assembly having a webcam connector assembly configured for magnetic coupling, adhesive coupling, suction coupling, or clamping, rather than signal connection.

FIG. 4 illustrates a magnetic webcam mounting assembly used with metal backing plate 400 in accordance with one embodiment. A screen display 402 may include a select screen display region 308 where a user would wish to direct their gaze during a video teleconference, as previously described. The magnetic webcam mounting assembly 100 may be coupled to the screen display 402 through magnetic attraction to a metal backing plate positioned behind the screen display 404.

This select screen display region 308 may not be in the center of the screen as shown at all times. The magnetic webcam mounting assembly 100 allows both horizontal motion 310 and vertical motion 312 of the movable webcam 108 across the screen display 402, such that the movable webcam 108 may be configured within a select screen display region 308 anywhere on the screen display 402.

FIG. 5 illustrates a magnetic webcam mounting assembly with metal backing plate and generally transparent screen display attachment 500 in accordance with one embodiment. A useful generally transparent screen display attachment is disclosed in U.S. Pat. No. 11,174,985, titled Camera-Positioning Apparatuses and Methods, issued Nov. 16, 2021, the content of which is incorporated by reference herein in its entirety. The screen display 402 may be configured with a generally transparent screen display attachment 502 having an angulated upper section 504 for hooked placement on, and concomitant suspension from, a top end of the screen display 506. The screen display 402 may include a select screen display region 308 where a user would wish to direct their gaze during a video teleconference, as previously described. The magnetic webcam mounting assembly 100 may be coupled to the generally transparent screen display attachment 502 through magnetic attraction to the metal backing plate placed behind the generally transparent screen display attachment 508.

This select screen display region 308 may not be in the center of the screen as shown at all times. The magnetic webcam mounting assembly 100 and generally transparent screen display attachment 502 allow both horizontal motion 510 and vertical motion 512 of the movable webcam 108 across the screen display 402, such that the movable webcam 108 may be configured within a select screen display region 308 anywhere on the screen display 402. As shown, the generally transparent screen display attachment 502 may be slid in a horizontal motion 510 across the upper region of the screen display 402 while suspended downwardly there across. The magnetic webcam mounting assembly 100 may be repositioned in a vertical motion 512 along the height of the generally transparent screen display attachment 502 (as well as along its width for more granular horizontal control as needed.

FIG. 6A and FIG. 6B illustrate webcam articulation 600 in accordance with one embodiment. In the illustrated embodiment, the magnetic webcam mounting assembly 100 introduced in FIG. 1A and FIG. 1B includes an articulating ball joint connector assembly 602. In this embodiment, a ball joint 604 within a ball joint socket 606 may connect the articulating ball joint connector assembly 602 to the magnetic base 102.

This ball and socket connection between the magnetic base 102 and the articulating ball joint connector assembly 602 allows the articulating ball joint connector assembly 602 and thus an attached movable webcam (not pictured here) to be adjusted with vertical articulation 608 and with horizontal articulation 610 to change an angle of the movable webcam 612 with respect to a user. Such a magnetic webcam mounting assembly 100 may thus further facilitate the ability of the user to gaze concurrently at their point of focus on the screen display and into the lens of their movable webcam.

For example, a movable webcam mounted on a laptop screen that is lower than the user's line of sight may be angled upward to provide a direct line of sight into the lens of the movable webcam. Alternately, a movable webcam coupled to a wall-mounted display screen that is to the user's upper left may be angled down and to the right, again providing a direct line of sight for the user's gaze into the webcam's lens. User lines of sight 700 are illustrated more fully in FIG. 7A and FIG. 7B.

Figure 7B:
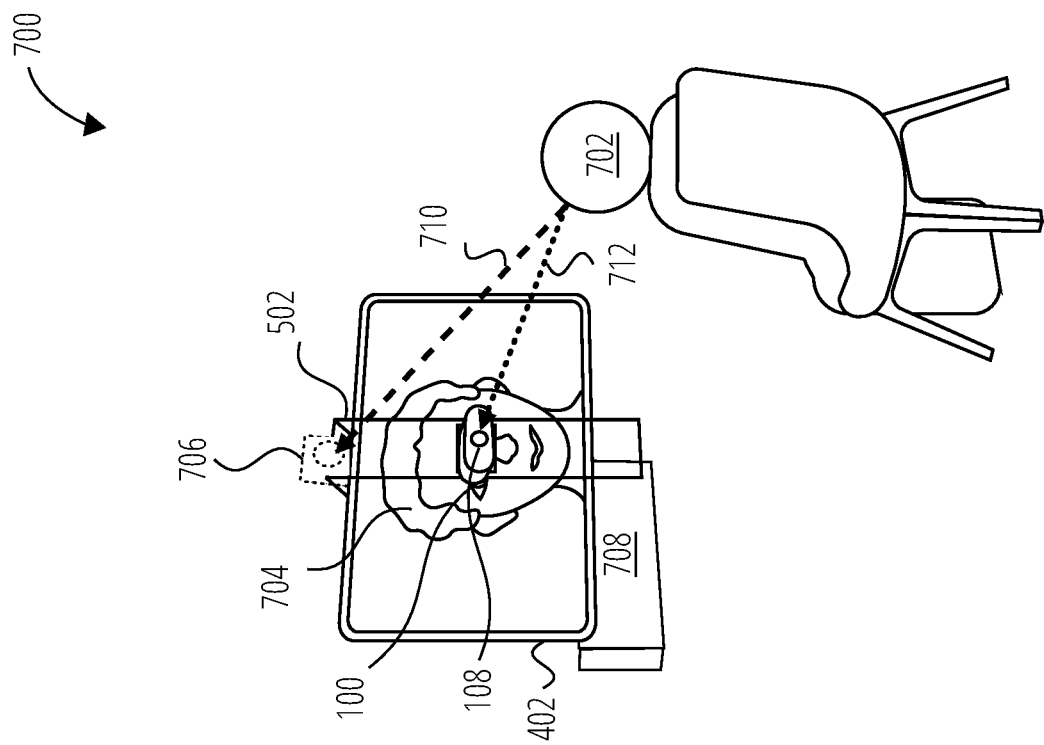
FIG. 7A and FIG. 7B illustrate user lines of sight 700 in accordance with one embodiment.
Figure 7A:
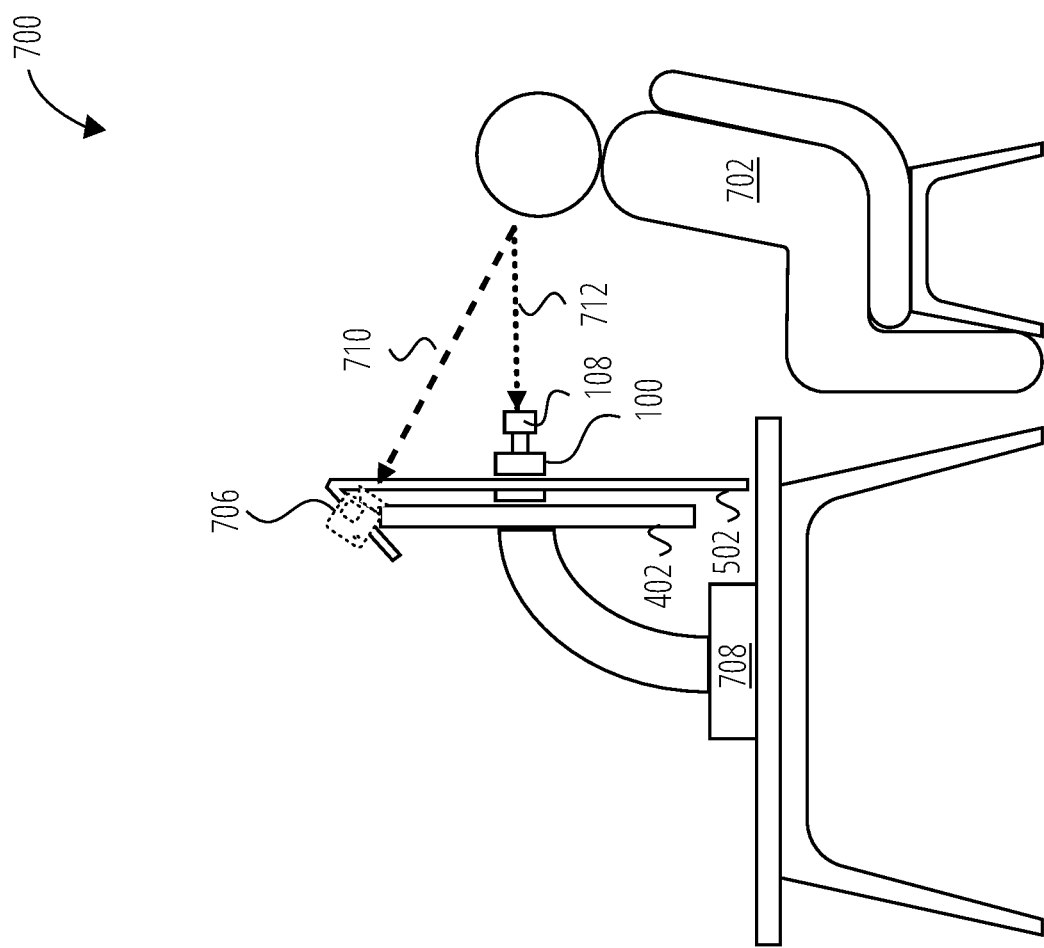

FIG. 7A and FIG. 7B illustrate user lines of sight 700 in accordance with one embodiment. FIG. 7A shows an elevation view and FIG. 7B a perspective view of user lines of sight 700. A user 702 may be seen seated and looking at a screen display 402. The screen display 402 may be showing an image 704, as may be seen in FIG. 7B.

FIG. 7A and FIG. 7B illustrate how the disclosed magnetic webcam mounting assembly 100 may provide the user 702 with the ability to look directly at their monitor and still maintain eye contact with the person(s) they are speaking with. This is achieved in four ways:

1. The webcam may be positioned vertically or horizontally anywhere on the screen by moving the magnetic webcam mount and the hanger, as illustrated in FIG. 3, FIG. 4, and FIG. 5, rather than the webcam being placed only on the top periphery of the screen, as shown by webcam 706.
2. The webcam may be within the same relative plane as the monitor, rather than a camera mounted on a device which stands further away from the monitor.
3. Because the mounting assembly is close to the monitor, the webcam may obscure the least possible amount of space on the monitor, as indicated in FIG. 7B.
4. The mounting assembly allows the webcam to tilt up or down as illustrated in FIG. 6A and FIG. 6B, so that the angle of the camera lens is always in alignment with respect to the user's gaze.

Figure 11:
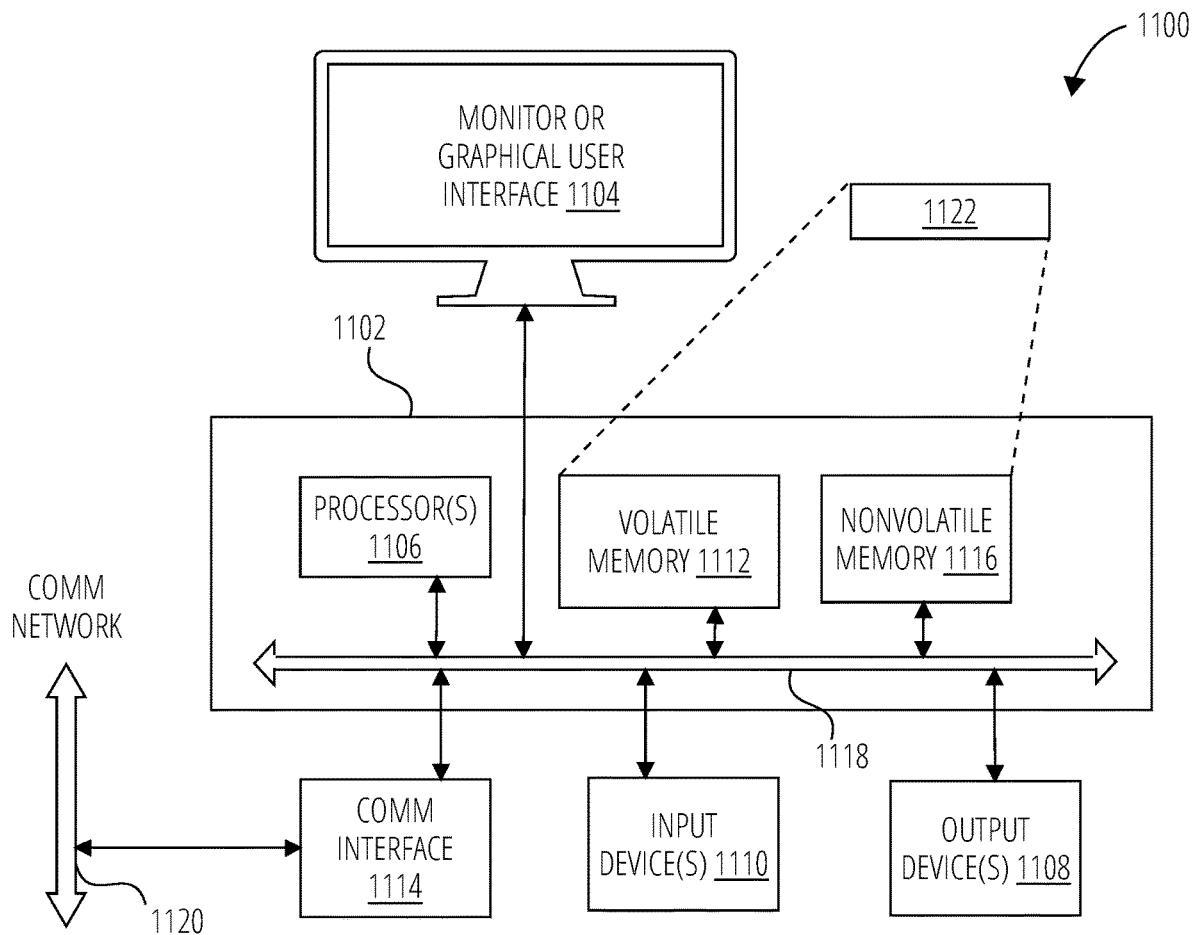
FIG. 11 is an example block diagram of a computing device 1100 that may incorporate embodiments of the present disclosure.

In a conventional teleconference setting, a webcam 706 may be integrated into the top of the screen display 402 or may be mounted directly above the screen display 402, and may be connected to a computer 708 such as the computing device 1100 describe with respect to FIG. 11. In such a setting, to be imaged by the webcam 706 as gazing at the webcam 706 and thus into the eyes of a person viewing video from the webcam 706, the user 702 would need to effect a peripheral line of sight 710 that deviates from the user's natural inclination to look directly at the image 704 of the person they are engaging with, within the boundaries of the screen display 402.

The disclosed magnetic webcam mounting assembly 100 facilitates mounting a movable webcam 108 in a location that allows the user 702 to adopt a natural, comfortable direct line of sight 712, such that their gaze is upon the image 704 on the screen display 402 and at the same time into the lens of the movable webcam 108, as shown. This mounting is shown using a generally transparent screen display attachment 502, but one of skill in the art will understand that all of the disclosed embodiments provide this advantage. In addition to facilitating a more engaged and connected conversation by promoting natural eye contact, the ability to locate the web camera within a desired portion of the screen that is lower than its upper periphery allows the user to maintain the connected eye-line with less of the stress upon neck and shoulder muscles that comes from maintaining an elevated gaze for long periods.

Figure 8:
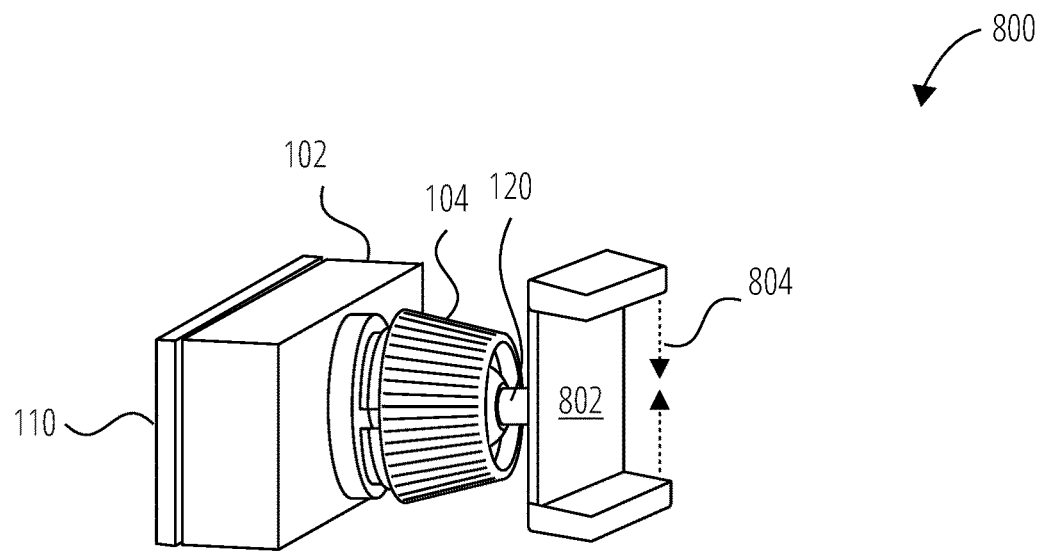
FIG. 8 illustrates a magnetic webcam mounting assembly 800 in accordance with one embodiment.

FIG. 8 illustrates a magnetic webcam mounting assembly 800 in accordance with one embodiment. The magnetic webcam mounting assembly 800 comprises a metal backing plate 110, a magnetic base 102, a magnetic base coupling assembly 104, a connector assembly body 120, and a clamp 802.

The clamp 802 may provide a compressive force 804 capable of securing a movable webcam to the magnetic webcam mounting assembly 800. The clamp 802 may attach to the magnetic base 102 via a ball and socket joint configuration as shown, or by other movable or static joints, as will be well understood by one of skill in the art.

Figure 9:
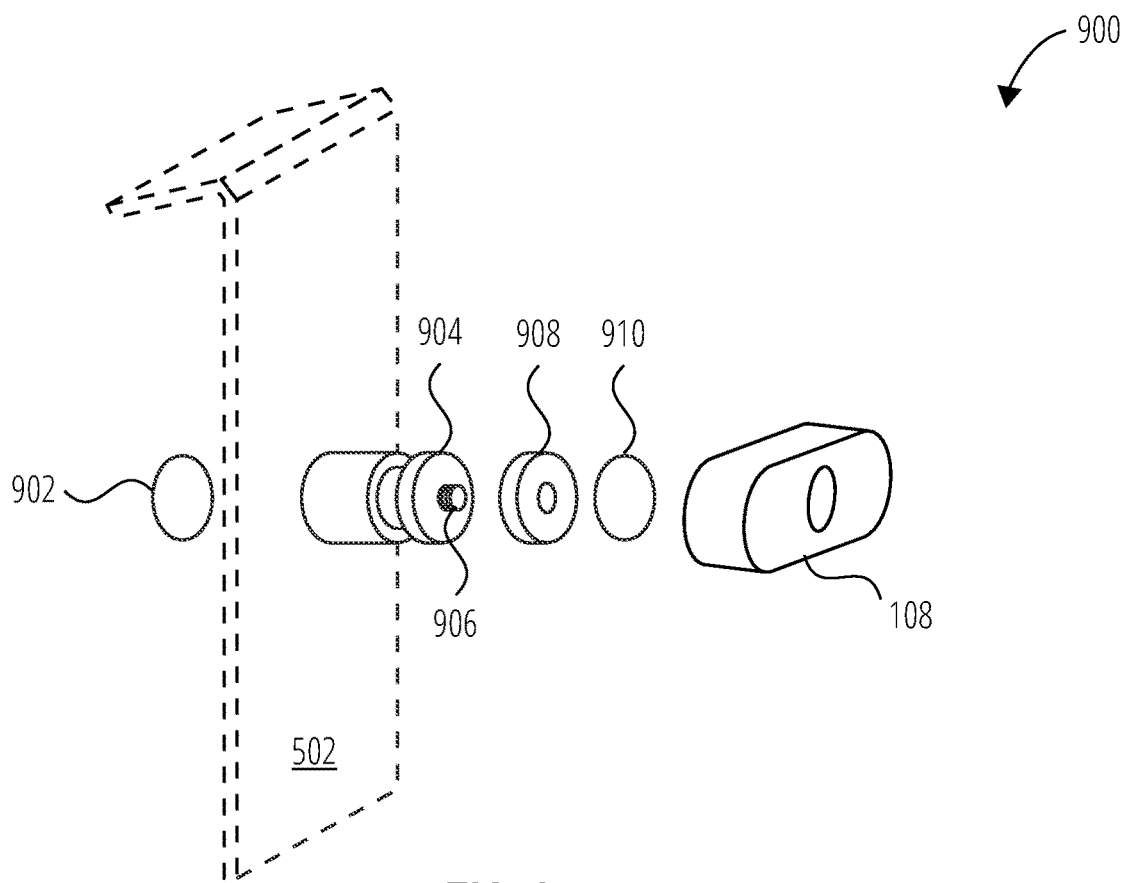
FIG. 9 illustrates a magnetic webcam mounting assembly 900 in accordance with one embodiment.

FIG. 9 illustrates a magnetic webcam mounting assembly 900 in accordance with one embodiment. A metal backing plate 902 may allow a magnetic base 904 to be coupled to a screen display or a generally transparent screen display attachment 502, as previously described. The magnetic base 904 may include a threaded screw 906 allowing the attachment of a threaded nut 908. The threaded nut 908 may be temporarily or permanently secured to the movable webcam 108 using a double-sided adhesive component 910. In this manner, the movable webcam 108 may be coupled to the magnetic base 904 by screwing the adhered threaded nut 908 onto the threaded screw 906.

Other embodiments of the magnetic webcam mounting assembly 100 not illustrated may couple the movable webcam to the magnetic webcam mounting assembly 100 using magnetic coupling, suction, or other schemes for cohesion, as will be well understood by one of skill in the art.

FIG. 10A and FIG. 10B illustrate a curved screen display configuration 1000 in accordance with one embodiment. FIG. 10A shows a perspective view and FIG. 10B a plan view of the curved screen display configuration 1000.

A curved screen display 1002 may be configured with or without a magnetic component. A magnetic webcam mounting assembly 1004 designed to couple to a curved screen may, in a manner similar to those configurations described with respect to FIG. 3, FIG. 4, and FIG. 5, be used with or without an appropriately designed (i.e. curved) metal backing plate and with or without an appropriately designed (i.e. curved) generally transparent screen display attachment, as will be well understood by one of ordinary skill in the art.

A magnetic webcam mounting assembly 1004 may be configured to mount a movable webcam 108 on a curved screen display 1002. To accomplish this, the magnetic webcam mounting assembly 1004 may be configured with a curved or deformable magnetic base 1006. For example, a magnet of rigid but moldable ferrous material may be molded with a curved surface conformable to a standard or common curvature used in curved screen display 1002 technology. In one embodiment, such a magnet may be interchangeably coupled to the curved or deformable magnetic base 1006 such that a plurality magnets conformable to a plurality of common curvatures may be interchangeably coupled to the curved or deformable magnetic base 1006. Alternately, a magnet of easily deformable ferrous material, such as that used for flexible magnets, may be used, with or without a configured curvature, such that the magnetic surface of the curved or deformable magnetic base 1006 may deform to accommodate the curvature of a curved screen display 1002, or differences in curvature between multiple curved screen displays 1002. In a similar manner, a curved or deformable metal backing plate 1008 may be configured in accordance with an expected curvature of a curved screen display 1002, allowing the strongest possible magnetic coupling force between the curved or deformable metal backing plate 1008 and the curved or deformable magnetic base 1006.

While it is not illustrated, it will be readily apprehended by one of ordinary skill in the art that a generally transparent screen display attachment that primarily comprises the flat panel previously illustrated may include curvature along and across its angulated upper section that allows it to be placed over a top end of a curved screen display 1002. Such a curved attachment may allow the magnetic webcam mounting assembly 100 previously described to be used in conjunction with a curved screen display 1002.

A transparent plastic sheet 1010 may be applied to a screen display, such as the curved screen display 1002 illustrated, to protect the screen display from damage or residue which may be left by a magnetic webcam mounting assembly applied directly to the screen display. The transparent plastic sheet 1010 illustrated is a large sheet, but a smaller sheet may also be applied, such that the footprint of the magnetic webcam mounting assembly upon the screen display is covered and thus protected, while the rest of the screen display remains free of any potential obstruction. Such a small sheet may be removable and replaceable, such that it may be easily relocated to accommodate different select screen display regions.

FIG. 11 is an example block diagram of a computing device 200 that may incorporate embodiments of the present disclosure. FIG. 11 is merely illustrative of a machine system to carry out aspects of the technical processes described herein and does not limit the scope of the claims. One of ordinary skill in the art would recognize other variations, modifications, and alternatives. In one embodiment, the computing device 200 typically includes a monitor or graphical user interface 1104, a data processing system 1102, a communication network interface 1114, input device(s) 1110, output device(s) 1108, and the like.

As depicted in FIG. 11, the data processing system 1102 may include one or more processor(s) 1106 that communicate with a number of peripheral devices via a bus subsystem 1118. These peripheral devices may include input device(s) 1110, output device(s) 1108, communication network interface 1114, and a storage subsystem, such as a volatile memory 1112 and a nonvolatile memory 1116.

The volatile memory 1112 and/or the nonvolatile memory 1116 may store computer-executable instructions and thus forming logic 1122 that when applied to and executed by the processor(s) 1106 implement embodiments of the processes disclosed herein.

The input device(s) 1110 include devices and mechanisms for inputting information to the data processing system 1102. These may include a keyboard, a keypad, a touch screen incorporated into the monitor or graphical user interface 1104, audio input devices such as voice recognition systems, microphones, and other types of input devices. In various embodiments, the input device(s) 1110 may be embodied as a computer mouse, a trackball, a track pad, a joystick, wireless remote, drawing tablet, voice command system, eye tracking system, and the like. The input device(s) 1110 typically allow a user to select objects, icons, control areas, text and the like that appear on the monitor or graphical user interface 1104 via a command such as a click of a button or the like. Input device(s) 1110 may include cameras such as integrated webcams, or adaptors and connectors for integrating a movable webcam for use with the computing device 1100.

The output device(s) 1108 include devices and mechanisms for outputting information from the data processing system 1102. These may include the monitor or graphical user interface 1104, speakers, printers, infrared LEDs, and so on as well understood in the art.

The communication network interface 1114 provides an interface to communication networks (e.g., communication network 1120) and devices external to the data processing system 1102. The communication network interface 1114 may serve as an interface for receiving data from and transmitting data to other systems. Embodiments of the communication network interface 1114 may include an Ethernet interface, a modem (telephone, satellite, cable, ISDN), (asynchronous) digital subscriber line (DSL), Fire-Wire, USB, a wireless communication interface such as BlueTooth or WiFi, a near field communication wireless interface, a cellular interface, and the like.

The communication network interface 1114 may be coupled to the communication network 1120 via an antenna, a cable, or the like. In some embodiments, the communication network interface 1114 may be physically integrated on a circuit board of the data processing system 1102, or in some cases may be implemented in software or firmware, such as "soft modems", or the like.

The computing device 200 may include logic that enables communications over a network using protocols such as HTTP, TCP/IP, RTP/RTSP, IPX, UDP and the like.

The volatile memory 1112 and the nonvolatile memory 1116 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1112 and the nonvolatile memory 1116 may be configured to store the basic programming and data constructs that provide the functionality of the disclosed processes and other embodiments thereof that fall within the scope of the present invention.

Logic 1122 that implements embodiments of the present invention may be stored in the volatile memory 1112 and/or the nonvolatile memory 1116. Said logic 1122 may be read from the volatile memory 1112 and/or nonvolatile memory 1116 and executed by the processor(s) 1106. The volatile memory 1112 and the nonvolatile memory 1116 may also provide a repository for storing data used by the logic 1122.

The volatile memory 1112 and the nonvolatile memory 1116 may include a number of memories including a main random access memory (RAM) for storage of instructions and data during program execution and a read only memory (ROM) in which read-only non-transitory instructions are stored. The volatile memory 1112 and the nonvolatile memory 1116 may include a file storage subsystem providing persistent (non-volatile) storage for program and data files. The volatile memory 1112 and the nonvolatile memory 1116 may include removable storage systems, such as removable flash memory.

The bus subsystem 1118 provides a mechanism for enabling the various components and subsystems of data processing system 1102 communicate with each other as intended. Although the communication network interface 1114 is depicted schematically as a single bus, some embodiments of the bus subsystem 1118 may utilize multiple distinct buses.

It will be readily apparent to one of ordinary skill in the art that the computing device 200 may be a device such as a smartphone, a desktop computer, a laptop computer, a rack-mounted computer system, a computer server, or a tablet computer device. As is commonly known in the art, the computing device 200 may be implemented as a collection of multiple networked computing devices. Further, the computing device 200 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

LISTING OF DRAWING ELEMENTS

100 magnetic webcam mounting assembly
102 magnetic base
104 magnetic base coupling assembly
106 connector assembly
108 movable webcam
110 metal backing plate
112 threaded ball seat
114 screw
116 ball tightening nut
118 threaded screw hole
120 connector assembly body
122 first end of the connector assembly body
124 second end of the connector assembly body
126 base connector assembly
128 webcam connector assembly
130 video signal connection
200 routine for positioning a movable webcam relative to a screen display
202 block
204 block
206 block
208 decision block 210 block
212 block
300 magnetic webcam mounting assembly used with magnetically attracted screen display
302 magnetically attracted screen display
304 screen surface
306 magnetic component
308 select screen display region
310 horizontal motion
312 vertical motion
314 USB video signal cable
316 USB connection
400 magnetic webcam mounting assembly used with metal backing plate
402 screen display
404 metal backing plate positioned behind the screen display
500 magnetic webcam mounting assembly with metal backing plate and generally transparent screen display attachment
502 generally transparent screen display attachment
504 angulated upper section
506 top end of the screen display
508 metal backing plate placed behind the generally transparent screen display attachment
510 horizontal motion
512 vertical motion
600 webcam articulation
602 articulating ball joint connector assembly
604 ball joint
606 ball joint socket
608 vertical articulation
610 horizontal articulation
612 angle of the movable webcam
700 user lines of sight
702 user
704 image
706 webcam
708 computer
710 peripheral line of sight
712 direct line of sight
800 magnetic webcam mounting assembly
802 clamp
804 compressive force
900 magnetic webcam mounting assembly
902 metal backing plate
904 magnetic base
906 threaded screw
908 threaded nut
910 double-sided adhesive component
1000 curved screen display configuration
1002 curved screen display
1004 magnetic webcam mounting assembly
1006 curved or deformable magnetic base
1008 curved or deformable metal backing plate
1010 transparent plastic sheet
1100 computing device
1102 data processing system
1104 monitor or graphical user interface
1106 processor(s)
1108 output device(s)
1110 input device(s)
1112 volatile memory
1114 communication network interface
1116 nonvolatile memory
1118 bus subsystem
1120 communication network
1122 logic Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the disclosure as claimed. The scope of disclosed subject matter is not limited to the depicted embodiments but is rather set forth in the following claims.

What is claimed is:

1. A method of positioning a movable webcam connected to a computer relative to a screen display of the computer while imaging a user in select, reciprocal viewing alignment with the screen display, the method comprising:
   providing a magnetic webcam mounting assembly including:
   a magnetic base;
   a magnetic base coupling assembly on the magnetic base;
   a connector assembly including:
   a connector assembly body;
   a base connector assembly attached to a first end of the connector assembly body, the base connector assembly configured to couple with the magnetic base coupling assembly; and
   a webcam connector assembly attached to a second end of the connector assembly body, the webcam connector assembly configured to mount the movable webcam, wherein the webcam connector assembly has an electrical connector to establish an electrical connection with a webcam when the webcam is mounted;
   securing the movable webcam to the webcam connector assembly;
   positioning the magnetic webcam mounting assembly in relationship to the screen display to secure the movable webcam on a screen surface of a select screen display region generally coextensive with an image being observed by the user, the positioning including:
   on condition the screen display has a magnetic component behind the screen surface:
   securing the magnetic webcam mounting assembly to the surface of the screen display by magnetically coupling the magnetic base to the screen display;
   on condition the screen display does not have the magnetic component behind the screen surface:
   securing the magnetic webcam mounting assembly to the screen surface of the screen display by placing a metal backing plate behind the screen display such that the magnetic base is coupled to the screen display by magnetic attraction to the metal backing plate;
   wherein viewing of the image by the user facilitates the viewing of the user viewing the image in select, reciprocal viewing alignment therewith.

2. The method of claim 1, wherein the magnetic base coupling assembly is a ball joint socket and the connector assembly is an articulating ball joint connector assembly including:
   a ball joint attached to the first end of the connector assembly body, the ball joint configured to couple with the ball joint socket.

3. The method of claim 2, further comprising adjusting, relative to the user, an angle of the movable webcam by rotating the articulating ball joint connector assembly in the ball joint socket.

4. The method of claim 1, further comprising connecting a video signal to the webcam connector assembly through the electrical connector, wherein the webcam connector assembly further comprises a video signal connection on the connector assembly body.

5. The method of claim 4, wherein the video signal connection is a USB connection.

6. The method of claim 4, wherein the video signal connection is substantially perpendicular to the connector assembly body.

7. The method of claim 1, further comprising placing a transparent plastic sheet between the surface of the screen display and the magnetic base.

8. The method of claim 1, wherein the webcam connector assembly comprises a clamp configured to secure the movable webcam by applying a compressive force against opposing sides of the movable webcam and securing the movable webcam to the webcam connector assembly includes placing the movable webcam within the clamp.

9. The method of claim 1, wherein the webcam connector assembly comprises an adhesive component configured to adhere to the back of the movable webcam and securing the movable webcam to the webcam connector assembly includes pressing the movable webcam against the adhesive component.

10. An apparatus for positioning a movable webcam connected to a computer relative to a screen display of the computer while imaging a user in select, reciprocal viewing alignment with the screen display, the apparatus comprising:
    a magnetic webcam mounting assembly including:
    a magnetic base;
    a ball joint socket attached to the magnetic base;
    an articulating ball joint connector assembly including:
    a connector assembly body;
    a ball joint attached to a first end of the connector assembly body, the ball joint configured to couple with the ball joint socket; and
    a webcam connector assembly attached to a second end of the connector assembly body, the webcam connector assembly configured to mount the movable webcam wherein the webcam connector assembly has an electrical connector to establish an electrical connection with a webcam when the webcam is mounted; and
    on condition the screen display does not have a magnetic component behind a screen surface:
    a metal backing plate, configured to secure the magnetic webcam mounting assembly to the screen surface of the screen display when the metal backing plate is positioned behind the screen display such that the magnetic base is coupled to the screen display by magnetic attraction to the metal backing plate,
    wherein the magnetic webcam mounting assembly is configured to secure the movable webcam to the surface of the screen display in a select screen display region generally coextensive with an image being observed by the user, so that viewing of the image by the user facilitates the viewing of the user viewing the image in select, reciprocal viewing alignment therewith.

11. The apparatus of claim 10, further comprising a video signal connection on the connector assembly body, wherein the video signal connection is electrically connected to the electrical connector.

12. The apparatus of claim 11, wherein the video signal connection is a USB connection.

13. The apparatus of claim 12, wherein the video signal connection is substantially perpendicular to the connector assembly body.

14. The apparatus of claim 10, wherein the webcam connector assembly comprises a clamp configured to secure the movable webcam using a compressive force.

15. An apparatus for positioning a movable webcam connected to a computer relative to a screen display of the computer while imaging a user in select, reciprocal viewing alignment with the screen display, the apparatus comprising:

a magnetic webcam mounting assembly including:
  a magnetic base;
  a ball joint socket attached to the magnetic base;
  an articulating ball joint connector assembly including:
    a connector assembly body;
    a ball joint attached to a first end of the connector assembly body, the ball joint configured to couple with the ball joint socket; and
    a webcam connector assembly attached to a second end of the connector assembly body, the webcam connector assembly configured to mount the movable webcam; and
a generally transparent screen display attachment for mounting to and horizontal movement across an upper region of the screen display while suspended downwardly there across; and
a metal backing plate, configured to secure the magnetic webcam mounting assembly to the surface of the generally transparent screen display attachment when the metal backing plate is positioned behind generally transparent screen display attachment such that the magnetic base is coupled to the generally transparent screen display attachment by magnetic attraction to the metal backing plate,
wherein the generally transparent screen display attachment, the magnetic webcam mounting assembly, and the metal backing plate are configured to be positioned in relationship to the screen display for supporting the movable webcam in a select screen display region generally coextensive with an image being observed by the user, so that viewing of the image by the user facilitates the viewing of the user viewing the image in select, reciprocal viewing alignment therewith.

16. The apparatus of claim 15, wherein the generally transparent screen display attachment has an angulated upper section for hooked placement on, and concomitant suspension from, a top end of the screen display.

17. The apparatus of claim 15, further comprising a video signal connection on the connector assembly body.

18. The apparatus of claim 17, wherein the video signal connection is a USB connection.

19. The apparatus of claim 18, wherein the video signal connection is substantially perpendicular to the connector assembly body.

20. The apparatus of claim 15, wherein the webcam connector assembly comprises a clamp configured to secure the movable webcam using a compressive force.

* * * * *